(12) United States Patent
Smirnov

(10) Patent No.: US 11,438,287 B2
(45) Date of Patent: *Sep. 6, 2022

(54) SYSTEM AND METHOD FOR GENERATING AND REPRODUCING ULTRA SHORT MEDIA CONTENT

(71) Applicant: Interactive Standard LLC, Northbrook, IL (US)

(72) Inventor: Andrey Smirnov, Northbrook, IL (US)

(73) Assignee: Interactive Standard LLC, Northbrook, IL (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/901,141

(22) Filed: Jun. 15, 2020

(65) Prior Publication Data

US 2021/0392099 A1 Dec. 16, 2021

(51) Int. Cl.
*H04L 12/00* (2006.01)
*H04L 51/10* (2022.01)
(Continued)

(52) U.S. Cl.
CPC ............ *H04L 51/10* (2013.01); *G06F 16/483* (2019.01); *G06F 16/487* (2019.01); *G06F 16/489* (2019.01); *H04L 51/08* (2013.01)

(58) Field of Classification Search
USPC ........................................ 709/231, 201, 236
See application file for complete search history.

(56) References Cited

U.S. PATENT DOCUMENTS 8,301,696 B2* 10/2012 Myers ................ H04N 21/435
    709/231
8,898,228 B2* 11/2014 Myers ................ H04N 21/2389
    709/231

(Continued)

FOREIGN PATENT DOCUMENTS

WO    2019205872 A1    10/2019

OTHER PUBLICATIONS

Ozturk Ece Oeztuerk@ Nomor De et al.: "Low latency DASH—more than just spec DASH-IF test tools", Proceedings of the 11th ACM Multimedia Systems Conference, New York, NY, USA, May 27, 2020 (May 27, 2020), pp. 353-356.

(Continued)

*Primary Examiner* — Frantz Coby
(74) *Attorney, Agent, or Firm* — ArentFox Schiff LLP; Michael Fainberg

(57) ABSTRACT

A method for reproducing ultra-short media content includes receiving, by a first computing device of a user, media content items associated with the same event or object. Each of the media content items includes self-contained media fragments. The received media content items are generated by two or more different computing devices. The first computing device sorts the self-contained media fragments based on camera angles of the different computing devices generating corresponding self-contained media fragments with respect to the event or object. The first computing device combines self-contained media fragments into a new media content item based on user-specified criteria to gen- (Continued)

erate a multiple-angle recording of the event or object. Each of the self-contained media fragments is received one by one at the first computing device and displayed as the uninterrupted media stream while subsequent self-contained media fragments are being received from the different computing devices.

20 Claims, 8 Drawing Sheets

(51) Int. Cl.
*G06F 16/487* (2019.01)
*G06F 16/483* (2019.01)
*G06F 16/48* (2019.01)
*H04L 51/08* (2022.01)

(56) References Cited

U.S. PATENT DOCUMENTS

| | | | |
|---|---|---|---|
| 10,462,519 B2 * | 10/2019 | Drake | G11B 27/031 |
| 10,862,837 B1 * | 12/2020 | Smirnov | G06F 16/489 |
| 11,081,140 B1 * | 8/2021 | Cheng | H04N 5/9305 |
| 2009/0287648 A1 * | 11/2009 | Yacobi | H04L 9/3263 |
| 2014/0010517 A1 | 1/2014 | Shefler | |
| 2016/0294763 A1 | 10/2016 | Miller | |
| 2017/0085936 A1 | 3/2017 | Shefler | |
| 2018/0192142 A1 | 7/2018 | Debashish | |
| 2019/0261039 A1 | 8/2019 | Woschank et al. | |

OTHER PUBLICATIONS

Weigang Zhang et al: "A Novel Framework for Web Video Thumbnail Generation", Intelligent Information Hiding and Multimedia Signal Processing (IIH-MSP), 2012 Eighth International Conference on, IEEE, Jul. 18, 2012 (Jul. 18, 2012), pp. 343-346.

Tsao Chun-Ning et al: "Thumbnail Image Selection for VOD Services", 2019 IEEE Conference on Multimedia Information Processing and Retrieval (MIPR), IEEE, Mar. 28, 2019 (Mar. 28, 2019), pp. 54-59.

* cited by examiner

SYSTEM AND METHOD FOR GENERATING AND REPRODUCING ULTRA SHORT MEDIA CONTENT

TECHNICAL FIELD

The present invention relates the field of content sharing, and more specifically, to systems and methods for exchanging ultra-short media content between user devices.

BACKGROUND

The ever increasing speed and the reduced size of electronic components has contributed to the proliferation of personal computing devices capable of processing and exchanging digital media such as text, audio, video, images, animation, clip art and other content. Personal computing devices include for example, smart phones, tablets, laptops, handheld game consoles, smart TVs, smart watches, smart glasses, etc. Many existing personal computing devices are able to store large amounts of digital content, wirelessly connect to the Internet and exchange data with other computing devices.

People often communicate or exchange information using computing devices (or systems). Conventional approaches to communicating via computing devices can include text messaging, such as short message service (SMS) and multimedia messaging service (MMS). For example, under conventional approaches, a first computing device can transmit a communication, including text, images, audio, and/or video, etc., to a second computing device over a cellular or local network. The second computing device can receive the communication and immediately (or almost immediately) view, access, or otherwise interact with the content included in the communication. In these cases the computing devices exchange whole, fully formed media content items, such as, but not limited to, text, video, audio, images/photo, and the like. Alternatively, the computing devices may exchange media content items over streaming network connections in, for example, VOIP (Voice Over IP), broadcast mode.

In both conventional modes of communication, the recipient of the content can access, view, or interact with the content upon receipt of the content without any significant effort. For example, when a recipient computing device receives an image and/or video file, a user of the computing device can select, click, or tap on, etc., the image to view and/or download the image and/or video file.

However, the aforementioned first conventional mode of communication has significant drawback when transmitting bulk media content items. The time lag from the start of the recording of the media content item by the user of the communication initiating device to the moment of playback on the recipient's device may include, but is not limited to, the time of recording of the entire media content item, the time of sending it from the initiating device (usually to the server) and the time of receiving the media content item on the recipient's device (usually from the server). Since all these processes are sequential and directly depend on the duration of the media content files, the overall delay can be significant.

The second (broadcast) mode requires that the users participating in the communication session (e.g., video session) be online simultaneously. In addition, the transmission performance of the channel and transmission errors in it (such as packet losses or delays), typically, may lead to a decrease in the perceived quality of the transmitted media content.

SUMMARY

Embodiments of the present invention address the aforementioned shortcomings of conventional modes of communication and are directed to a computer method and system used for personal and group communication sessions in chats, groups, and/or channels by different participants using computing devices. The disclosed system enables such communication by employing a plurality of ultra-short media content segments that may be automatically converted from/to single media content items (video, audio, text, and others) by embedding or encoding ultra-short informational "content" into the media stream. For example, if the duration of the media content segment is about 3 seconds, the time from the start of recording the media content item on the communication initiating device to the time of playback on the recipient device is the sum of the duration of the recording of the media content segment (about 3 seconds), the time for processing and transmission of the media content segment to the recipient device, totals from about 3 seconds to about 6 seconds. At the same time, advantageously, the transmission speed and interference in the channel do not impair the quality of the transmitted media content.

In various embodiments, the system may store a plurality of ultra-short media content segments. Media content segments may be filtered based on user preferences and stored in a classified database allowing the user to browse the stored media content at the user's leisure. Previously stored media content may also be filtered at an end-user device based on user preferences to provide a collection of one or more ultra-short segments. This collection of ultra-short segments and/or tags associated with the ultra-short segments may be shared with other users. Each of the ultra-short segments is a self-contained video, audio or text which can be played, edited, published, etc. Various embodiments of the present disclosure can utilize computing devices (or systems) to provide for interactively exchanging ultra-short self-contained media content in a collaborative manner.

In one exemplary embodiment, a method for exchanging ultra-short media content is provided. A media content item is recorded by a first computing device. The media content item includes at least one of a video message, audio message or a text message. The first computing device divides the recorded media content item into a plurality of self-contained media fragments during the recording of the media content item. Each of the plurality of self-contained media fragments has a predefined duration (up to 3 seconds long). The first computing device processes the plurality of self-contained media fragments to generate service information associated with a corresponding media fragment while recording and dividing subsequent self-contained media fragments. The service information includes a preview frame if the media content item being recorded is a video message. The first computing device transmits the plurality of self-contained media fragments to a second computing device to view as a media stream while continuing to record, divide and process subsequent self-contained media fragments. Each of the plurality of self-contained media fragments is received one by one at the second computing device and displayed as an uninterrupted media stream while the subsequent self-contained media fragments are being received from the first computing device.

BRIEF DESCRIPTION OF THE DRAWINGS

The accompanying drawings, which are incorporated into and constitute a part of this specification, illustrate one or more example embodiments of the present disclosure and, together with the detailed description, serve to explain their principles and implementations.

DETAILED DESCRIPTION

Exemplary aspects are described herein in the context of a system, method, and a computer program for exchanging ultra-short media content between user devices. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
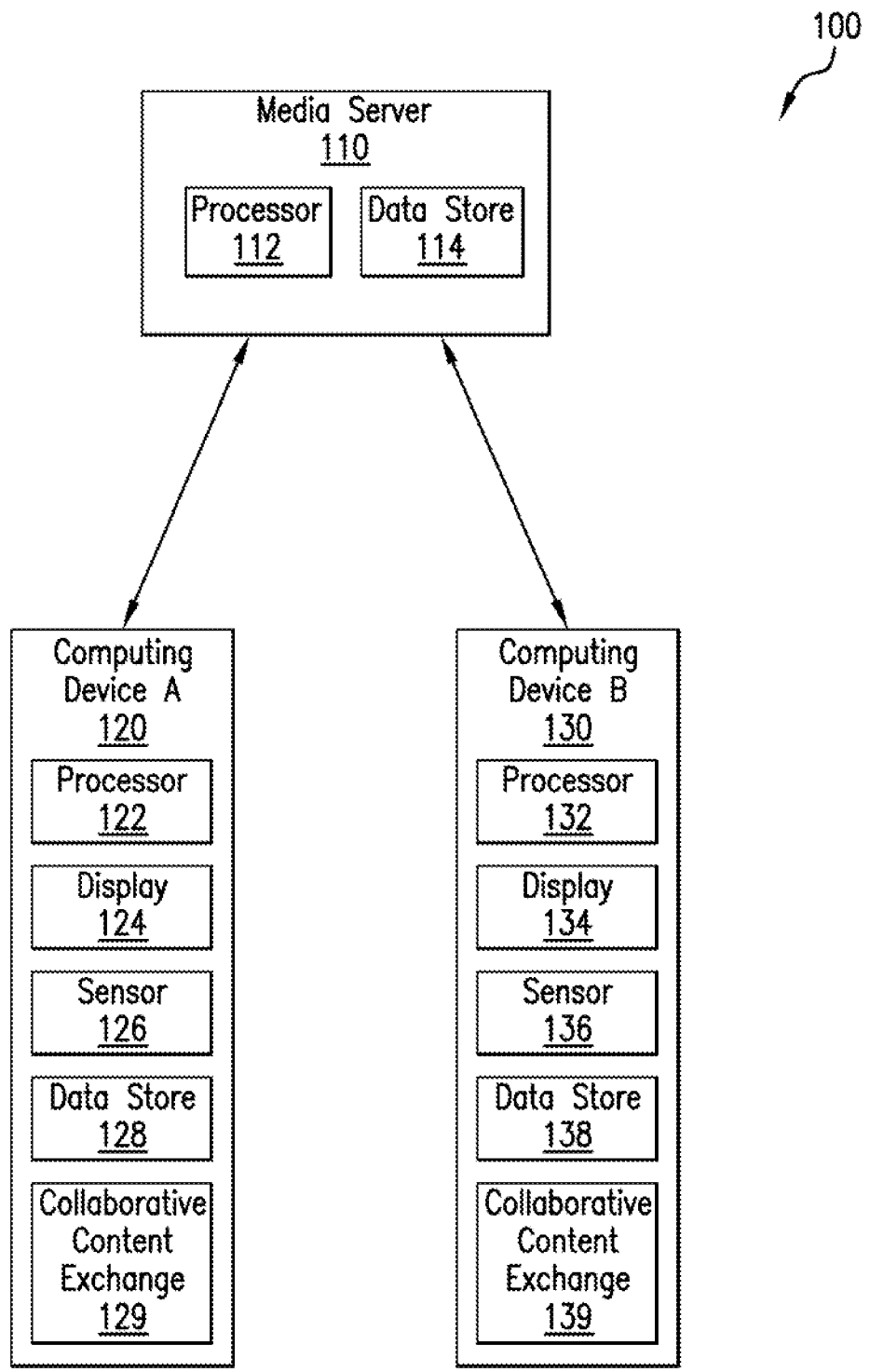
FIG. 1 illustrates an example system configured to provide for collaboratively exchanging media content, according to an embodiment of the present disclosure.

FIG. 1 illustrates an example system 100 configured to provide for collaboratively exchanging ultra-short media content, according to an embodiment of the present disclosure. The example system 100 can include a media server 110 (e.g, a cloud server) and a plurality of computing devices (e.g., computing device A 120, computing device B 130, computer system 600 in FIG. 6, etc.). In some embodiments, the media server 110 can comprise at least one processor 112 and at least one data store 114. The at least one processor 112 can be configured to facilitate performing various tasks of the media server 110. The at least one data store 114 can be configured to store various types of data and information, such as media content, including, but not limited to ultra-short media fragments, service information and other metadata associated with the ultra-short media fragments, and the like.

In the example of FIG. 1, the one or more computing devices can include a first computing device (e.g., computing device A) 120 and a second computing device (e.g., computing device B) 130. Computing device A 120 can comprise at least one processor 122, at least one display 124, at least one sensor 126, and at least one data store 128. Similarly, computing device B 130 can also comprise at least one processor 132, at least one display 134, at least one sensor 136, and at least one data store 138. For each computing device (e.g., computing device A 120, computing device B 130, etc.), the at least one processor (e.g., processor 122, processor 132, etc.) can facilitate various operations of the respective device. Each of the display elements 124 and 134 can be configured to display or present visual content. Each of the sensors 126 and 136 can be configured to acquire, gather, determine, and/or detect data. In some cases, each of sensors 126 and 136 can include (but is not limited to) at least one of a touch sensor (e.g, touch display), an audio sensor (e.g., microphone), or an image sensor (e.g., camera), an accelerometer, a gyroscope, a locational sensor (e.g., GPS), etc. Moreover, the data stores 128 and 138 can be configured to store information associated with operations of the computing devices.

With reference to FIG. 1, in some embodiments, a collaborative content exchange module/component 129 (e.g., a messaging app) installed on computing device A 120 can cause computing device A 120 to acquire a first media content item (e.g., image, video, etc.) using the at least one sensor 126 (e.g., camera). For example, a user of computing device A 120 can initiate and utilize the collaborative content exchange component 129 to cause a front-facing and/or rear-facing camera on computing device A 120 to take a photo or video. The acquired first media content item (e.g., photo, video, etc.) can correspond to an original, full resolution, and/or unobscured (e.g., substantially clear, unaltered, etc.) version of the first media content item. In an embodiment, the collaborative content exchange module 129 can split in real-time, while the media content item is being acquired, recorded, and/or processed, the acquired first media content item into a plurality of ultra-short self-contained media fragments referred to hereinafter as "mediabites" As used herein, the terms "ultra-short self-contained media fragment" and "mediabite" are used interchangeably and refer to a data file containing video, audio, text and/or clip art and metadata (service information) associated therewith. In one embodiment, each mediabite has a predefined fixed duration of about 3 seconds long. However, in other embodiments, the mediabite can be shorter or longer than that based on system, network-, application and/or user requirements. The collaborative content exchange module 129 can provide the sequential transmission of mediabites to recipients, combining into media content items and playback as a single media stream. In some embodiments, the collaborative content exchange module 129 can cause computing device A 120 to transmit the plurality of mediabites of the first media content item to the media server 110, and the media server 110 can combine the mediabites received from one or more computing devices to generate a single media stream.

Furthermore, the collaborative content exchange module 129 can cause computing device A 120 to transmit the media stream that includes at least the first media content item to computing device B 130. In some embodiments, the transmission of the media stream from computing device A 120 to computing device B 130 can be performed via the media server 110. For example, the media server 110 can relay communications, including content, between computing device A 120 and computing device B 130.

When computing device B 130 receives the media stream that includes at least the first media content item, the collaborative content exchange module/component 139 can enable computing device B 130 to provide access to the received media stream. The received media stream can include a plurality of media content items generated by several users. If a media stream is generated by several users, then, the collaborative content exchange module/component 139 can play these recordings sequentially, taking into account the recording time, author, geographic location, position, orientation, order, logically complete media content item, and the like. According to embodiments of the present disclosure, all mediabites present technically independent complete media units (video or audio). As such, the user of computing device B 130 might desire to see the mediabites to be combined by other criteria.

In some cases, the user of computing device B 130 may desire to add a new content item to the received media stream. In order to modify the received media stream, the collaborative content exchange module 139 can enable the user of computing device B 130 to utilize the at least one sensor 136 (e.g, front-facing camera, rear-facing camera, etc.) to acquire a second media content item (e.g., image, video, etc.), which can correspond to a different version of the same event/object represented by the first media content item. The collaborative content exchange module 139 can cause computing device B 130 (or media server 110) to generate a modified or new media stream that would include both the first and the second media content item. The user of computing device B 130 can choose to send the modified version of the media stream back to computing device A 120 (e.g., via media server 110).

In one example scenario, the collaborative content exchange component 129 can cause computing device A 120 to capture an original image. The collaborative content exchange component 129 can split the recorded video stream into mediabites, each of which is independently processed, encoded and packaged in a container. The collaborative content exchange component 129 can further utilize specialized technical solutions that provide, at the recording stage, an accurate count of the duration of the recorded mediabites, synchronization of audio and video data, and a high speed of stream processing. Upon receipt of the media stream by the computing device B 130, the collaborative content exchange component 139 can enable the user of the computing device B 130 to select the mediabites they like (not only their own) from the stream, edit them, rearrange them in any order, delete unnecessary ones and post the resulting video. This process can repeat over time, resulting in a plurality of media content items being interactively exchanged in a collaborative manner. Thus, using their own mediabites in combination with those from other chat or channel participants, users can co-create a video by collaboration, mixing media streams of various creators.

Figure 2:
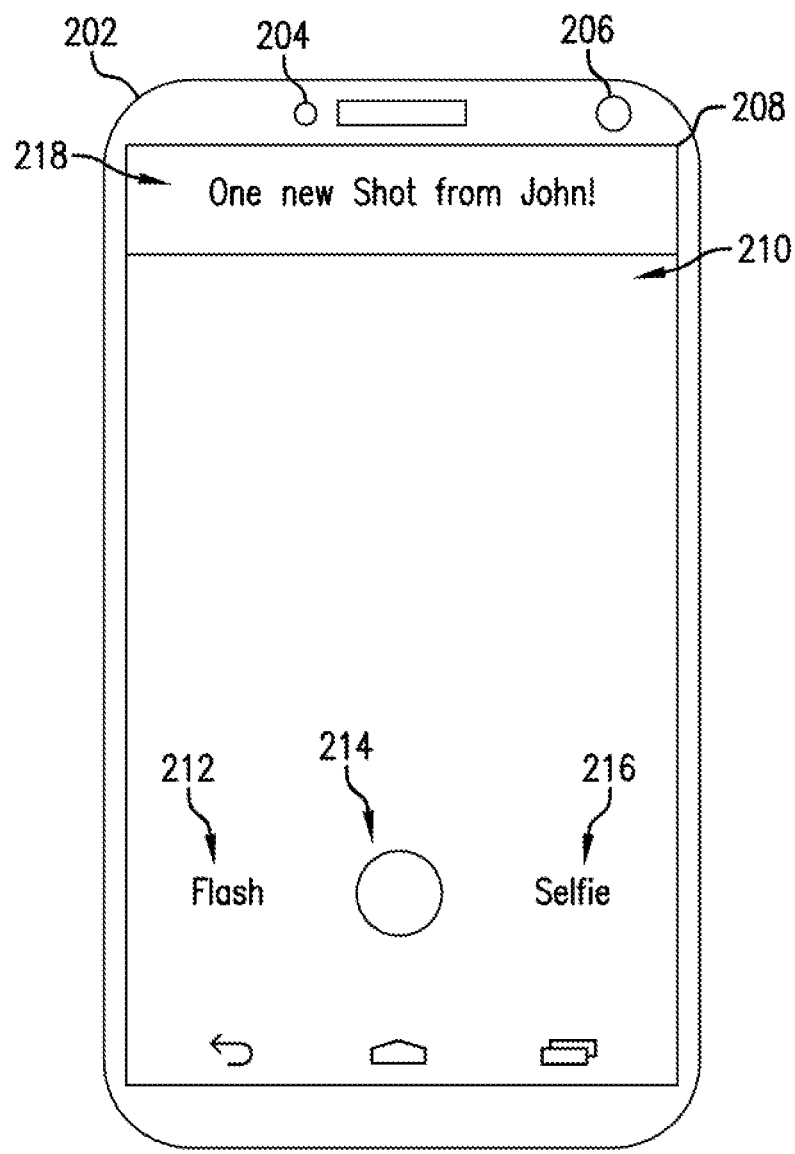
FIG. 2 illustrates an example computing device configured to provide for collaboratively exchanging media content, according to an embodiment of the present disclosure.

FIG. 2 illustrates an example computing device 202 configured to provide for collaboratively exchanging media content, according to an embodiment of the present disclosure. The example computing device 202 (e.g., computer system 600 in FIG. 6) can comprise one or more sensors, such as a front-facing image sensor (e.g., front-facing camera) 204 and a rear-facing image sensor (e.g., rear-facing camera) 206. The example computing device 202 can also comprise a display element (e.g., display screen, touch screen, etc.) 208 configured to present visual content.

In some embodiments, the computing device 202 can be configured to run a collaborative content exchange application. In some cases, the collaborative content exchange application can be associated with a collaborative content exchange component (e.g., collaborative content exchange module 129 or collaborative content exchange module 139 in FIG. 1). In one example, the collaborative content exchange application can initiate a camera mode. The camera mode can provide a view 210 of whatever imagery a selected camera (e.g., front-facing camera 204, rear-facing camera 206, etc.) currently "sees" or detects.

As shown in FIG. 2, the camera mode of the collaborative content exchange application can provide various user interface elements including (but not limited to) an icon (or button) 212 for configuring flash, an icon 214 for recording, and an icon 216 for switching cameras. In some cases, the icon (or button) 212 for configuring flash can correspond to a text icon including the text "Flash". The icon 214 for recording can start and stop the recording of images or videos In some cases, the icon 216 for switching cameras can correspond to a text icon including the text "Selfie", which can be a term that refers to a picture of oneself In some implementations, pressing, tapping, or otherwise interacting with the "Selfie" icon or button 216 can switch the camera that is in currently use, for example, from the rear-facing camera 206 to the front-facing camera 204 during recording which allows the user to comment on the events being recorded by the rear facing camera 206.

In one example, when a communication including, for example, a first ultra-short media content item is received from another computing device via media server 110, a notification 218 can be presented by the interactive content exchange application In FIG. 2, the notification 218 can indicate that the communication, which can also be referred to as a "Shot", is received from a user named "John". Continuing with the example, a user of the computing device 202 can tap on, click on, or otherwise interact with the notification 218 and/or device 202 in order to obtain more information about the communication (e.g., "Shot") from "John".

Figure 3:
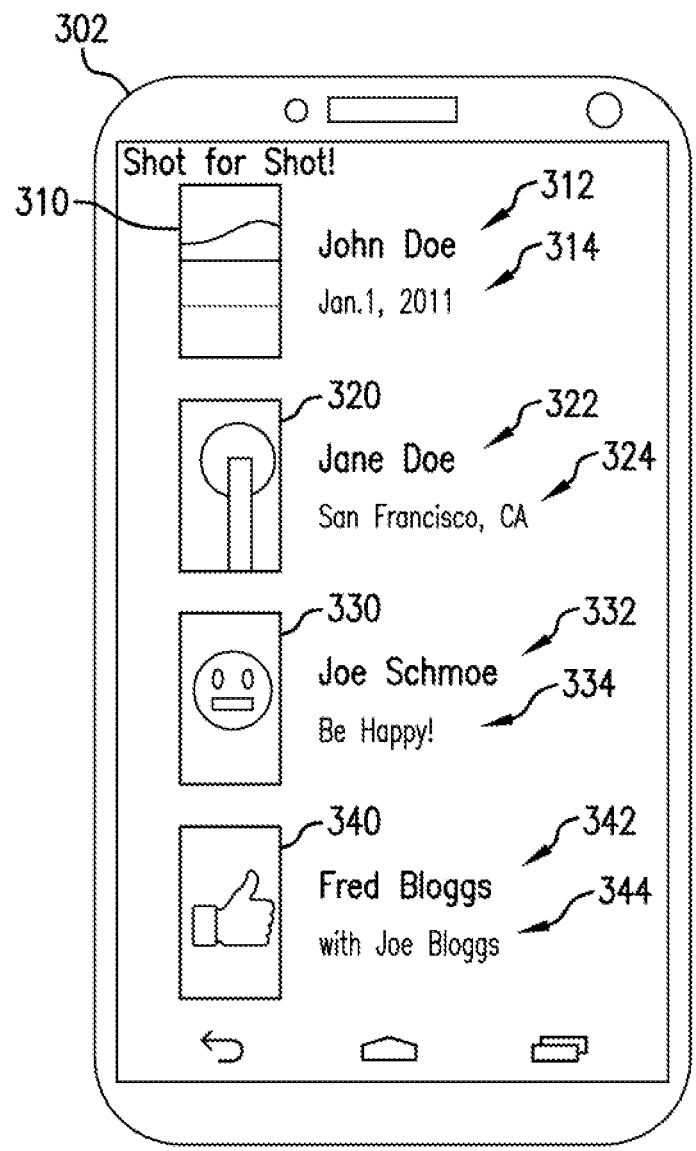
FIG. 3 illustrates an example computing device configured to provide for collaboratively exchanging media content, according to an embodiment of the present disclosure.

FIG. 3 illustrates an example computing device 302 (e.g., computer system 600 in FIG. 6) configured to provide for collaboratively exchanging media content, according to an embodiment of the present disclosure. As discussed above with reference to FIG. 2, a user can interact with a notification, which indicates that a communication (e.g., "Shot") has been received, in order to obtain more information about the received communication. The received communication may include a media content item comprising a plurality of mediabites. In FIG. 3, when the user interacts with the notification, the collaborative content exchange application can display one or more received mediabites from the one or more communications accessed by the user.

In the example of FIG. 3, four mediabites are shown. The mediabites can, for example, be displayed or listed from most recently received communication to least recently received communication (or vice versa). In this example, the first mediabite can include a self-contained ultra-short segment 310 of a first media content item (e.g., image, video, etc.) received from John Doe 312. The first mediabite can also be associated with metadata (service information) such as a date (or time) 314 when the corresponding mediabite was created.

The second mediabite 320 can be a part of a second media content item received from (or sent by) Jane Doe 322. The second mediabite can include service information indicating that the second media byte was created in a certain location (e.g., San Francisco, Calif. 324).

Continuing with the example of FIG. 3, the third mediabite 330 can be a pan of a third media content item received from Joe Schmoe 332 and a caption (e.g, "Be Happy!" 334). Furthermore, the fourth mediabite 340 can be a part of a fourth media content item received from Fred Bloggs 342 and may include a tag 344 indicating that the fourth mediabite (and/or the fourth media content item) is associated with Joe Bloggs.

In some embodiments, a mediabite can be associated with other service information including (but not limited to) a property, an identifier for a sending computing device that sent the mediabite, a speed at which the sending computing device was moving or being moved when the mediabite was created, an acceleration at which the sending computing device was undergoing when the mediabite was created, a direction at which the sending computing device was pointing when the mediabite was created, the weather conditions surrounding the sending computing device when the mediabite was created, and/or a title of a media being accessed (e.g., a song being played) by the sending computing device when the mediabite was created, etc.

As discussed above, the collaborative content exchange module 139 can enable the computing device 302 (or media server 110) to generate a modified or new media stream that would include both the first 310 and the second mediabites 320. Thus, users are capable of co-creating media content by using other peoples' mediabites in addition to their own. In one embodiment, users may combine two or more mediabites based on time and location of recording, for example.

Figure 4:
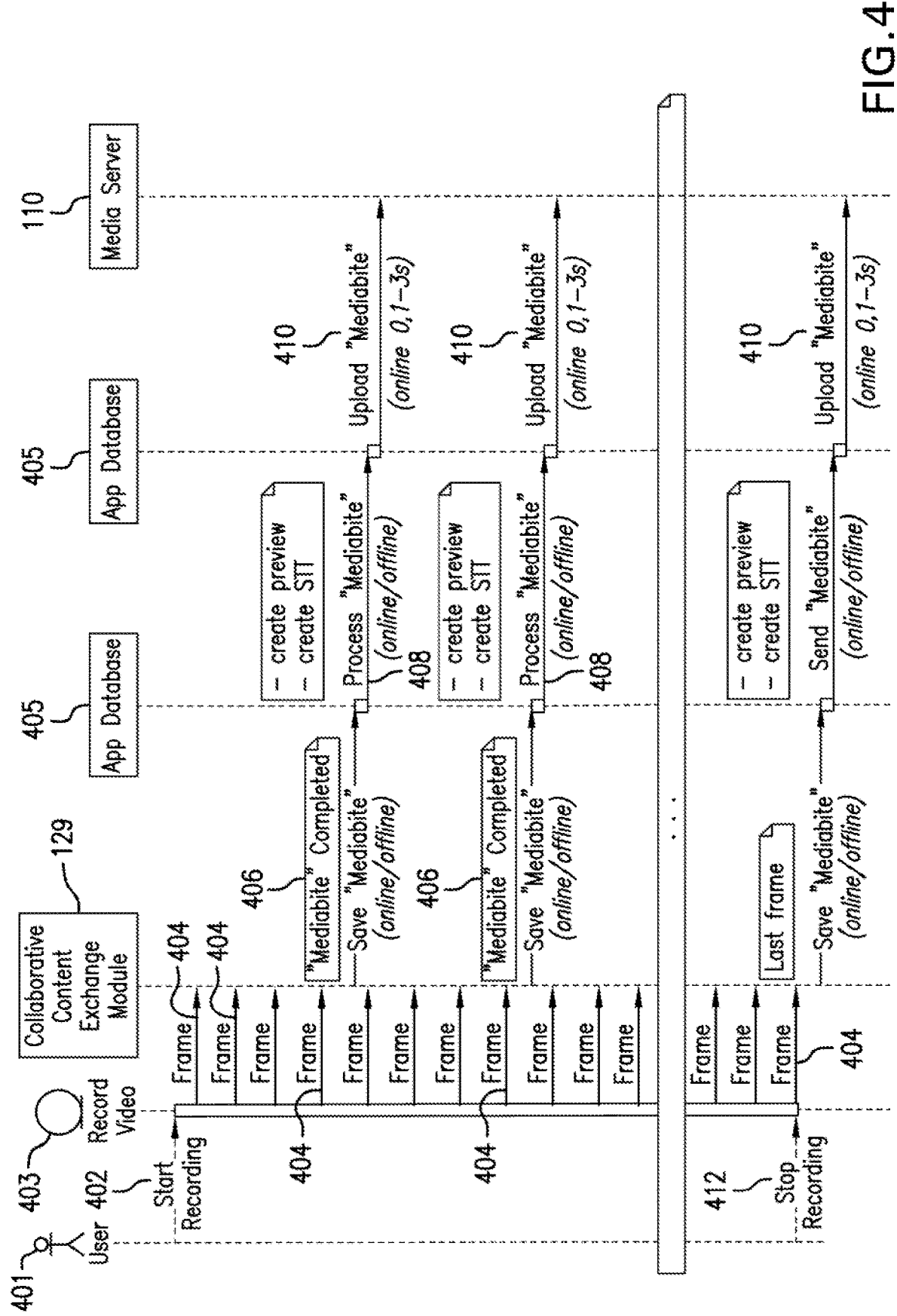
FIG. 4 is a sequence diagrams of steps for creating mediabites during message recording by a user, as well as steps for processing and sending mediabites using a first user's device, according to an embodiment of the present disclosure.

FIG. 4 is a sequence diagrams of steps for creating mediabites during message recording by a user, as well as steps for processing and sending mediabites using a first user's device, according to an embodiment of the present disclosure. At step 402 a user 401 may start recording a video 403, for example, by pressing the icon 214 for recording on computing device 202. The disclosed collaborative content exchange system may support a variety of video coding standards. The video coding standards may include but are not limited to ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITUT H.265 and ISO/IEC 23008-2, including its scalable coding extension (i.e., scalable high efficiency video coding, SHVC) and multiview extension (i.e., multiview high efficiency video coding, MV-HEVC). As soon as recording starts, the computing device 202 begins sending the recorded frames 404 to the collaborative content exchange module 129. In one embodiment, the collaborative content exchange module 129 may be configured to split the recorded video stream into mediabites substantially simultaneously ("on the fly") with the recording process 402. In various embodiments, the collaborative content exchange module 129 may implement specialized solutions that provide, during the recording step 402, an accurate count of the duration of recorded mediabites, synchronization of audio and video data containers, and a high speed of stream processing.

At step 406, after isolation from the recorded media stream, the collaborative content exchange module 129 may encode each mediabite of the received media stream and may package them into an MP4 container, for example. Furthermore, at step 406, the collaborative content exchange module 129 may store each mediabite as a separate independent video clip containing recorded video data in the database 405 (e.g., data store) of the computing device 202. Such video clips may later be combined into collaborative video streams, as described herein.

According to an embodiment of the present disclosure, at step 408, the collaborative content exchange module 129 may process each saved mediabite. The processing step 408 may include assigning a unique identifier to each mediabite and generating service information related to the corresponding mediabite. The service information may include, but is not limited to, the identifier of the media content item and the information about the mediabite's position within the media content item. According to an embodiment of the present disclosure, for video data included in each mediabite, the collaborative content exchange module 129 may generate a preview frame. The preview frame may comprise the video frame having best quality that is selected from all the video frames included in the mediabite using the Laplace transform, for example. As used herein, the term "video frame having best quality" may refer to the most clear frame. In one embodiment, the Laplace transform may be computed in each instance for the mediabite in the colour-containing difference between two individual frames of the mediabite, for example In one embodiment, the collaborative content exchange module 129 may encode the preview frame in JPG format or any other well-known standard and may include the preview frame in the service description of the corresponding mediabite.

Furthermore, at step 408, the collaborative content exchange module 129 may process audio data associated with each saved mediabite. In one embodiment, the collaborative content exchange module 129 may include a speech recognition module. Combination of speech recognition and natural language understanding processing techniques is commonly referred to as speech processing. Speech processing may also convert a user's speech into text data (subtitles), which may be included by the collaborative content exchange module 129 into the service description of the mediabite. Since, with respect to speech processing, recognition accuracy of the transcribed audio data typically improves with the increased duration of the audio data, at least in some embodiments, the collaborative content exchange module 129 may later regenerate and retransmit previously sent subtitles.

In addition, the service description (service information) of the mediabite may include the creation time of the mediabite, as well as other parameters and service features associated with the collaborative content exchange module 129. These parameters may include various data collected by sensors 126 and 136 including: geolocation data, gyro data, compass data, camera angle, relative distance to the subject being recorded, and the like. In some cases, each of sensors 126 and 136 can include (but is not limited to) at least one of a touch sensor (e.g., touch display), an audio sensor (e.g., microphone), or an image sensor (e.g., camera), an accelerometer, a gyroscope, a locational sensor (e.g., GPS), and the like.

According to an embodiment, at step 410, the collaborative content exchange module 129 may upload the generated mediabites, the preview frame and other service information associated with the mediabites to the media server 110. Advantageously, the upload step 410 takes place asynchronously with the recording 402 and processing steps 408. According to an embodiment, the uploaded mediabites may be temporarily cached in the storage of the media server 110, which enables delivery of the media stream to the recipient's computing device 130 regardless of the connection status of that device 130. At step 412 the user 401 may stop recording the video 403, for example, by pressing the icon 214 for recording on computing device 202 again. Eventually, all of the mediabites associated with the recorded media content item get uploaded to the media server 110, as shown in FIG. 4.

Figure 5:
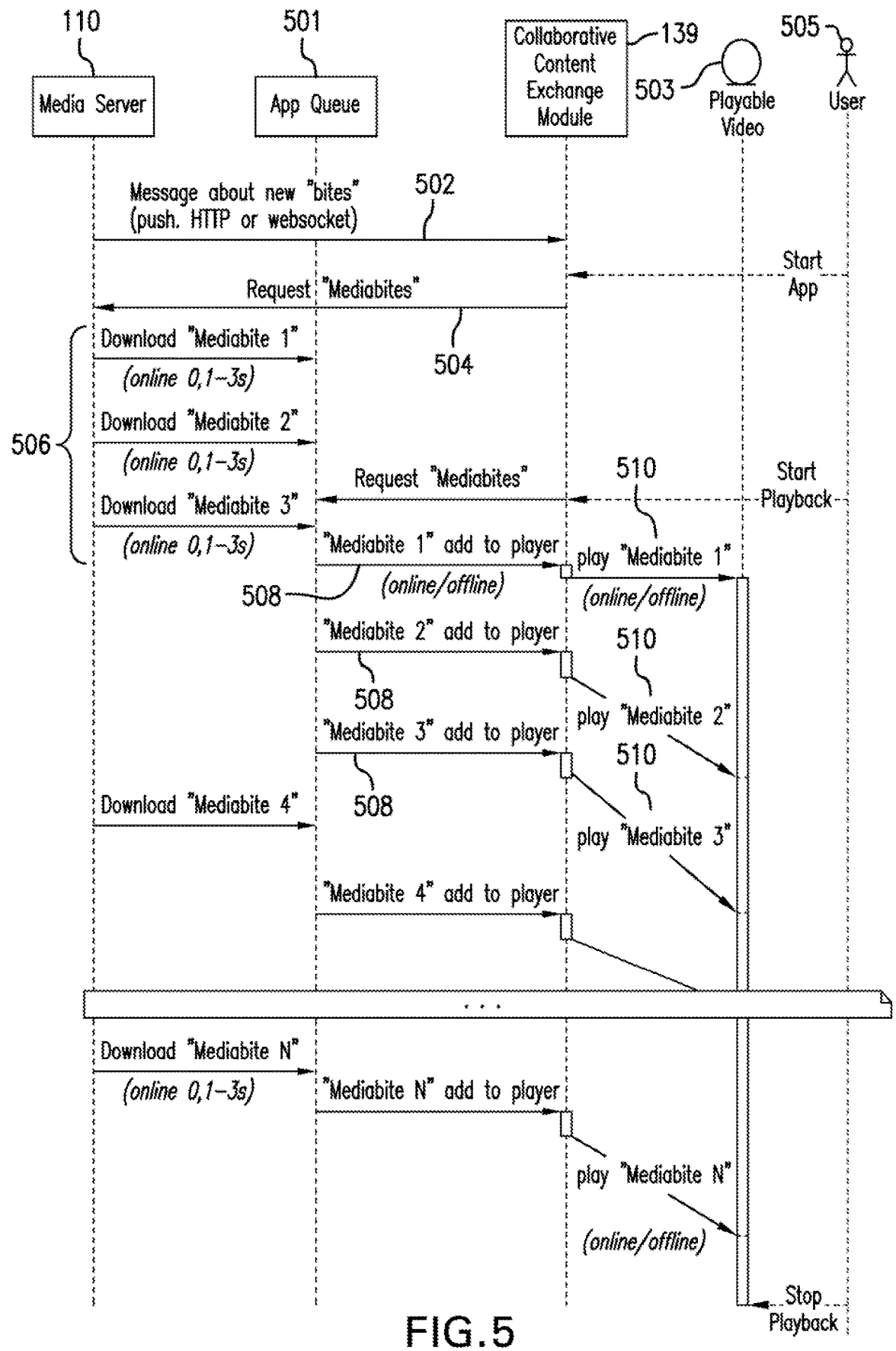
FIG. 5 is a sequence diagrams of steps for receiving and playing back the received mediabites using a second user's device, according to an embodiment of the present disclosure.

FIG. 5 is a sequence diagrams of steps for receiving and playing back the received mediabites using a second user's device, according to an embodiment of the present disclosure. While illustrated using an example of a two device implementation, other implementations are readily achievable using different numbers or combinations of computing devices. For example, mediabites may be received and processed from two or more different computing devices simultaneously. Based on the service information associated with the received mediabites, the media server 110 may identify the intended recipient of the received media content item. At step 502, the media server 110 may send a notification to the collaborative content exchange module 139 of the recipient computing device 130. In one embodiment, the notification may include a description of the received mediabites, links for downloading corresponding playable video data (e.g., video files) 503 as well as preview frames generated by the collaborative content exchange module 129 of the sender's device 120. In various embodiments, depending on the connection status of the recipient's computing device 130, the media server 110 may utilize a variety of protocols or a combination of any of these protocols to implement step 502. These protocols may include, but are not limited to WebSocket, Push, HTTP and the like.

As shown in FIG. 5, at step 504, the collaborative content exchange module 139 may send the confirmation of the delivery of the notification by sending back a request to the media server 110 to download mediabites. At step 506, the collaborative content exchange module 139 may start downloading the video data and other information required for presenting that video data including the preview frame of each mediabite, for example. Advantageously, the downloading step 506 may be performed asynchronously, at the pace selected by the recipient computing device 130 and does not affect the uploading step performed by the collaborative content exchange module 129 of the sender computing device 120. According to an embodiment, the collaborative content exchange module 139 may download the mediabites, store them locally on the recipient computing device 130 and put them on a queue 501 for playback. The downloaded mediabites may be put in the queue according to the sequence in the original media content item.

At step 508, the collaborative content exchange module 139 may start adding the downloaded mediabites to its player component. At step 510, the collaborative content exchange module 139 may start playing the mediabites according to their sequence numbers. In one embodiment, the collaborative content exchange module 139 may create a seamless continuous video stream when playing back the individual mediabites. In one embodiment, to exclude gaps and delays between playing mediabites, the collaborative content exchange module 139 may employ the techniques of advanced loading of mediabites Advance loading implies that the mediabite is fully loaded into the player component of the collaborative content exchange module 139 before playback. In an embodiment, the mediabite may be loaded in asynchronous parallel mode with the previous mediabites playing (if any).

It should be noted that all functions performed by the collaborative content exchange modules 129 and 139 of the respective computing devices, namely, all steps related to sending, receiving and playing media streams may be performed transparently for the users 401 and 505 both in online and offline modes. Advantageously, the steps related to sending and receiving the mediabites may be performed by the collaborative content exchange modules 129 and 139, respectively, independently of each other via the media server 110. In the case of simultaneous counter-sending of media content items by users 401 and 505, the exchange of the media content items may be carried out in both directions by the collaborative content exchange modules 129 and 139 independently of each other and according to the algorithm described above in conjunction with FIGS. 4 and 5. It should be noted that in the case of exchanging of media content items by a group of users, the receipt of media content items may be performed by all members of the group (with the exception of the author) at different time instances.

Figure 6A:
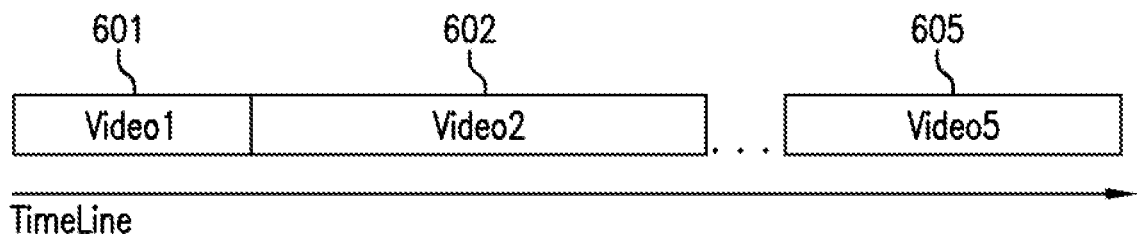
FIG. 6A illustrates conventional chronological playback of a set of media content items by the recipient computing device.

FIGS. 6A-6D illustrate how mediabites recorded by various users simultaneously in the same place can be combined together, according to an embodiment of the present invention. Generally, if the media stream is generated by several users, then, as a rule, applications play these recordings sequentially. FIG. 6A illustrates conventional chronological playback of a set of media content items (e.g., video tiles) by the recipient computing device. In FIG. 6A, media content items 601-605 are played sequentially one after another taking into account the recording time, for example.

Figure 6B:
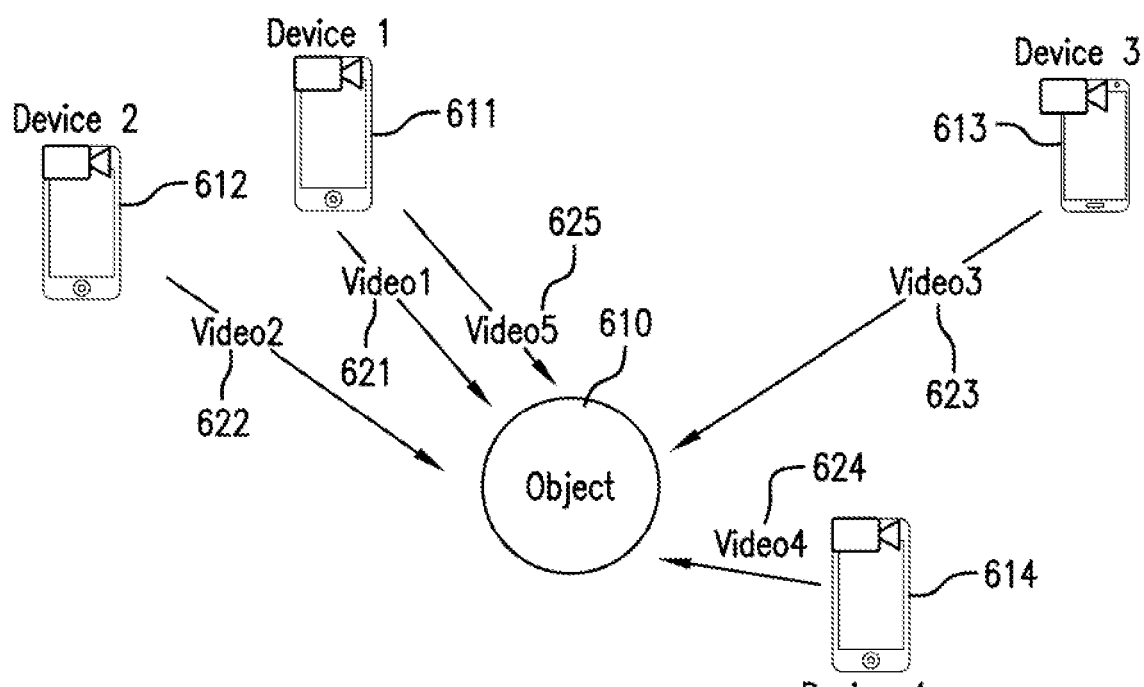
FIG. 6B illustrates an example of a plurality of computing devices recording the same object 610 simultaneously from different angles, according to an embodiment of the present disclosure.

In contrast, according to embodiments of the present invention, all mediabites are considered as technically independent complete media units (e.g., video), and they can be combined using other principles as well FIG. 6B illustrates an example of a plurality of computing devices 611-614 recording the same object 610 simultaneously from different angles. As a result a set of media content items 621-625 may be created that reflect the same event or the same object (such as object 610) recorded by different people from different angles, (i.e. a scored soccer goal or New Year's fireworks). The collaborative content exchange modules 129 running on respective devices 611-614 split the recorded video streams of content items into a plurality of mediabites.

Figure 6C:
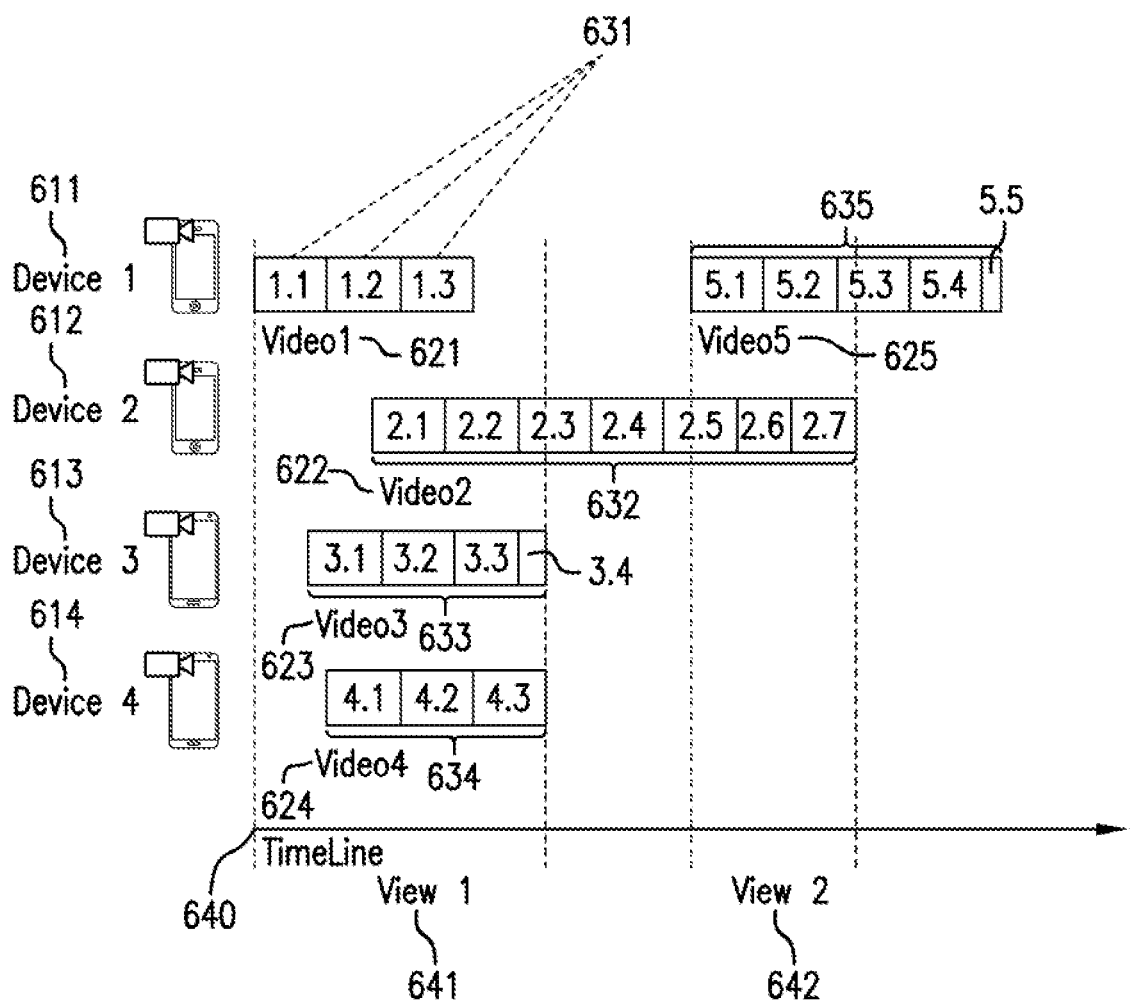
FIG. 6C illustrates a media content item recording timeline, according to an embodiment of the present disclosure.

FIG. 6C illustrates a media content item recording timeline 640. As shown in FIG. 6C, each of the recorded media content items 621-625 is split by the collaborative content exchange module 129 into respective sets of mediabites 631-635. Each of mediabites has service information associated therewith. The service information may include time markers and data received from the sensors of computing devices 611-614 Such sensor data may include but is not limited to: geo tag data representing a set of attributes associated with at least one location, gyro measurement data, compass data, data indicative of camera angle and/or relative distance to the object being recorded, and the like. Eventually, all of the mediabites associated with the recorded media content item 621-625 get uploaded to the media server 110, as shown in FIG. 4.

As described above in conjunction with FIG. 5, the collaborative content exchange module 139 hosted by the recipient computing device 130 may start downloading the video data and other information required for presenting that video data including the preview frame of each mediabite, for example. Advantageously, the downloading step may be performed asynchronously, at the pace selected by the recipient computing device 130. There can be several mediabite streams from various users received by the recipient computing device 130 substantially simultaneously. Furthermore, the recipient computing device 130 also can record a plurality of mediabites, which can be added to the received media stream(s) by the collaborative content exchange module 139.

According to an embodiment, the collaborative exchange module 139 may process the received mediabites. For example, the collaborative exchange module 139 may combine mediabites based on matching time markers. As another example, the collaborative exchange module 139 may combine mediabites based on any one or combination of service information attributes (geo tag, camera direction, camera angles, viewing angles, and the like). Sets of mediabites selected by using any aforementioned criteria may be grouped in packs.

Figure 6D:
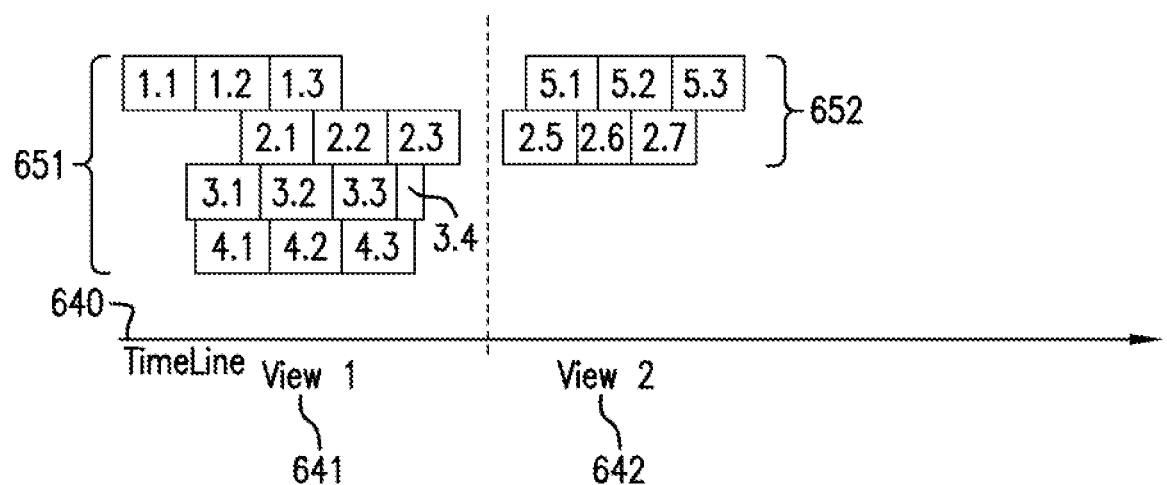
FIG. 6D illustrates packs 651 and 652 of mediabites combined by the collaborative exchange module 139 of the recipient computing device 130, according to an embodiment of the present disclosure.

FIG. 6D illustrates packs 651 and 652 of mediabites combined by the collaborative exchange module 139 of the recipient computing device 130. The first pack 651 of mediabites represents a first view 641 of an event or an object recorded by various users from different angles, different distance and with different degrees of detail. The second pack 652 of mediabites represents a second view 641 of an event or an object recorded by a subset of the users associated with the first pack 651. Advantageously, the user of the recipient computing device 130 may use the collaborative exchange module 139 to edit corresponding packs 651 and/or 652 by deleting unnecessary mediabites, sort them by distance or camera angle, rearrange mediabites, add music, subtitles or emoji, among other editing operations Thus, by adding mediabites recorded by other users to their own to essentially generate collaborative multiple-angle record of events or objects augmented with various comments, emotions and details.

According to an embodiment, the exchange of mediabites between users occurs through the server component (such as described media server 110), which allows the disclosed system to provide asynchronous user interaction, regardless of the online connection of other interaction participants. The media server 110 may be configured to optimize passing media streams and manage one or more characteristics of the media streams. In addition, the media server 110 may be configured to synchronize events (e.g., synchronize consumption of available content items) and states between various users (e.g., providing users access to content) involved in the interaction. The media server 110 may enable users to browse available content items from a plurality of different computing devices. Furthermore, the media server 110 may be configured to maintain optimal exchange rate between computing devices (such as the sender's computing device 120 and the recipient computing device 130) In one embodiment, the media server 110 may take into account the platform features, available protocols or settings on users' computing devices when exchanging data. For example, the media server 110 may use standard Content Delivery Network (CDN) resources and HTTP requests. At least in some embodiments, the media server 110 may also ensure correct media data passage through firewalls and proxy-servers.

In summary, when recording a media content item, such as a video, audio or text message on the sender's computing device 120, the collaborative content exchange module 129 may automatically "split" them into a plurality of ultra-short self-contained media fragments up to 3 seconds long, for example, that are referred to herein as mediabites. While recording the rest of the media content item, the collaborative content exchange module 129 may process each recorded mediabite and may transmit the processed mediabites to the recipients computing device through the media server 110 using the HTTP(S) protocol, for example. The collaborative content exchange module 139 deployed on the recipient's device 130 may provide "seamless" playback of the received mediabites in the form of a single media stream on the recipient's device 130.

Furthermore, the media content items may be exchanged between users of the sender's device 120 and the intended recipient device 130 and may be transmitted to each other in substantially parallel mode. Thus, the collaborative content exchange modules 129 and 139 may create a live communication session which may be visualized as an original media stream of media content data items from different participants, so that each media content item can be deployed to the certain set of mediabites.

According to an embodiment, the duration of each mediabite may be selected to fit the minimum necessary meaningful content into it. As noted above, each mediabite comprises an ultra-short self-contained media fragment. In other words, a mediabite is, on the one hand, a complete independent piece of media content contained within a media stream. On the other hand, each mediabite is the minimum technical media unit that all media content items consist of.

This self-contained characteristic of each mediabite enables users working with a mediabite as a full-fledged video/audio. In other words, users may be able to interact (play, edit, publish, etc.) with individual mediabites comprising all types of media content. In various embodiments, the user may be at least one of end users, consumers, advertisers, marketers, content providers, content owners, networks, broadcasters, media companies, mobile carriers, record companies, movie studios, regulators, mobile device designers, mobile device manufacturers, mobile service consolidators, affiliates or some other type of user.

Furthermore, the self-contained characteristic of each mediabite provides users greater flexibility in combining them to modify received media content items or generate new media content items. For example, users can select the mediabites they like (not only their own ones) from the stream, edit them, rearrange them in any order, delete unnecessary ones and publish the result. Users can combine mediabites by time and place of recording, resulting in a set of videos that cover the same event and objects from different angles by different people, (i.e. a scored soccer goal or New Year's fireworks). A mechanism of unique identifiers, automatically assigned to mediabites when they are created, allows users to link their stream to the media content of a parallel, often unrelated stream, include quotes from it or associate their comments and replies with it. For example, users can copy mediabites from public messages of other users into their stream. At the same time, special messages may be automatically generated in the users' stream about the mention of their mediabites with a link to them, so that users can quickly monitor the references to their media content and, if necessary, approve or block them.

Figure 7:
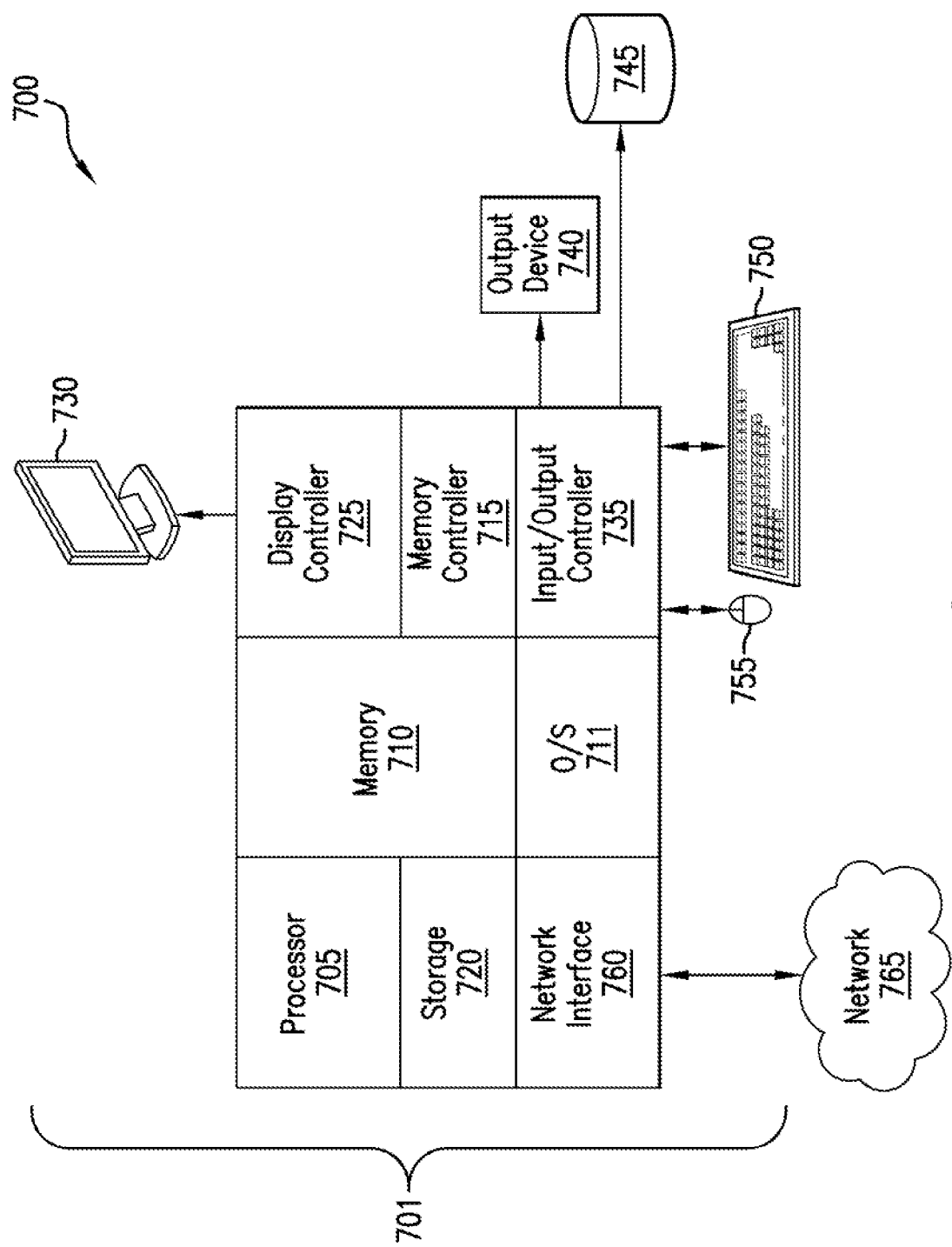
FIG. 7 illustrates an example of a computer system that can be utilized in various scenarios, according to an embodiment of the present disclosure.

FIG. 7 illustrates an example of a computer system that can be utilized in various scenarios, according to an embodiment of the present disclosure.

Turning now to FIG. 7, a computer system 100 in FIG. 1 configured to provide for collaboratively exchanging media content, is generally shown in accordance with one or more embodiments of the present disclosure. The methods described herein can be implemented in hardware, software (e.g., firmware), or a combination thereof. In one or more exemplary embodiments of the present disclosure, the methods described herein are implemented in hardware as part of the microprocessor of a special or general-purpose digital computer, such as a personal computer, workstation, minicomputer, or mainframe computer. The system 700 therefore may include general-purpose computer or mainframe 701 capable of running multiple instances of an O/S simultaneously.

In one or more exemplary embodiments of the present disclosure, in terms of hardware architecture, as shown in FIG. 7, the computer 701 includes one or more processors 705, memory 710 coupled to a memory controller 715, and one or more input and/or output (I/O) devices 740, 745 (or peripherals) that are communicatively coupled via a local input/output controller 735 The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 735 may include a plurality of sub-channels configured to access the output devices 740 and 745. The sub-channels may include fiber-optic communications ports.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

In accordance with one or more embodiments of the present disclosure, the memory 710 may include multiple logical partitions (LPARs) each running an instance of an operating system. The LPARs may be managed by a hypervisor, which may be a program stored in memory 710 and executed by the processor 705.

In one or more exemplary embodiments of the present disclosure, a conventional keyboard 750 and mouse 755 can be coupled to the input/output controller 735. Other output devices such as the I/O devices 740, 745 may include input devices, for example but not limited to a printer, a scanner, a camera, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730.

In one or more exemplary embodiments of the present disclosure, the system 700 can further include a network interface 760 for coupling to a network 765 The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g, using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), Intranet or other suitable network system and includes equipment for receiving and transmitting signal.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute instructions stored within the memory 710, to communicate data to and from the memory 710, and to generally control operations of the computer 701 pursuant to the instructions.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The embodiments of the present invention disclosed herein may be implemented as a computer system, a computer-implemented method, and/or a computer program product. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for reproducing ultra-short media content, the method comprising:
   receiving, by a first personal computing device of a user, two or more media content items associated with the same event or object, each of the two or more media content items comprising a plurality of self-contained media fragments, wherein the received two or more media content items are generated by two or more different computing devices;
   sorting, by the first computing device, the plurality of the self-contained media fragments based on camera angles of the two or more different computing devices generating corresponding self-contained media fragments with respect to the event or object; and
   combining, by the first computing device, self-contained media fragments from the two or more media content items into a new media content item based on user-specified criteria to generate a multiple-angle recording of the event or object,
   wherein each of the plurality of self-contained media fragments is received one by one at the first computing device and displayed as the uninterrupted media stream while subsequent self-contained media fragments are being received from the two or more different computing devices.

2. The method of claim 1, wherein each of the plurality of self-contained media fragments has a predefined duration and wherein the predefined duration is less than or equal to 3 seconds.

3. The method of claim 1, wherein each of the two or more media content items comprises a recording of the same object recorded by different computing devices simultaneously from different camera angles.

4. The method of claim 1, wherein combining, by the first computing device, self-contained media fragments from the two or more media content items further comprises recording, by the first computing device, the same event or object and wherein the new media content item includes the recording by the first computing device.

5. The method of claim 3, wherein each of the two or more media content items comprises the recording of the same event or object recorded by the different computing devices from different distances and with varying degrees of details of the event or object.

6. The method of claim 1, wherein the self-contained media fragments are combined sequentially based on respective recording times of each of the plurality of the self-contained media fragments.

7. The method of claim 1, wherein each self-contained media fragment has service information associated therewith and wherein the service information includes a preview frame if the media content item being recorded is a video message.

8. A system for reproducing ultra-short media content, the system comprising:
   a processor of a first personal computing device of a user configured to:
   receive two or more media content items, each of the two or more media content items associated with the same event or object, each of the two or more media content items comprising a plurality of self-contained media fragments, wherein the received two or more media content items are generated by two or more different computing devices;
   sort the plurality of the self-contained media fragments based on camera angles of the two or more different computing devices generating corresponding self-contained media fragments with respect to the event or object; and
   combine self-contained media fragments from the two or more media content items into a new media content item based on user-specified criteria to generate a multiple-angle recording of the event or object,
   wherein each of the plurality of self-contained media fragments is received one by one at the first computing device and displayed as an uninterrupted media stream while subsequent self-contained media fragments are being received from the two or more different computing devices.

9. The system according to claim 8, wherein each of the plurality of self-contained media fragments has a predefined duration and wherein the predefined duration is less than or equal to 3 seconds.

10. The system according to claim 8, wherein each of the two or more media content items comprises a recording of the same object recorded by different computing devices simultaneously from different camera angles.

11. The system according to claim 8, wherein the processor configured to combine self-contained media fragments from the two or more media content items is further configured to record the same event or object and wherein the new media content item includes the recording by the processor.

12. The system according to claim 10, wherein each of the two or more media content items comprises the recording of the same event or object recorded by the different computing devices from different distances and with varying degrees of details of the event or object.

13. The system according to claim 8, wherein the self-contained media fragments are combined sequentially based on respective recording times of each of the plurality of the self-contained media fragments.

14. The system according to claim 8, wherein each self-contained media fragment has service information associated therewith and wherein the service information includes a preview frame if the media content item being recorded is a video message.

15. A non-transitory computer readable medium comprising computer executable instructions for reproducing ultra-short media content, including instructions for:
   receiving, by a first personal computing device of a user, two or more media content items associated with the same event or object, each of the two or more media content items comprising a plurality of self-contained media fragments, wherein the received two or more media content items are generated by two or more different computing devices;
   sorting, by the first computing device, the plurality of the self-contained media fragments based on camera angles of the two or more different computing devices generating corresponding self-contained media fragments with respect to the event or object; and
   combining, by the first computing device, self-contained media fragments from the two or more media content items into a new media content item based on user-specified criteria to generate a multiple-angle recording of the event or object,
   wherein each of the plurality of self-contained media fragments is received one by one at the first computing device and displayed as the uninterrupted media stream while subsequent self-contained media fragments are being received from the two or more different computing devices.

16. The medium of claim 15, wherein each of the plurality of self-contained media fragments has a predefined duration and wherein the predefined duration is less than or equal to 3 seconds.

17. The medium of claim 15, wherein each of the two or more media content items comprises a recording of the same object recorded by different computing devices simultaneously from different camera angles.

18. The medium of claim 15, wherein the instructions for combining, by the first computing device, self-contained media fragments from the two or more media content items further comprises instructions for recording, by the first computing device, the same event or object and wherein the new media content item includes the recording by the first computing device.

19. The medium of claim 17, wherein each of the two or more media content items comprises the recording of the same event or object recorded by the different computing devices from different distances and with varying degrees of details of the event or object.

20. The medium of claim 15, wherein each self-contained media fragment has service information associated therewith and wherein the service information includes a preview frame if the media content item being recorded is a video message.

* * * * *